FIG. 3

United States Patent Office 3,333,574
Patented Aug. 1, 1967

3,333,574
METHOD OF AND DEVICE FOR FEEDING
ANIMALS
Samuel D. Harris, Rte. 2, Louisa, Va. 23117
Filed Nov. 29, 1966, Ser. No. 597,605
14 Claims. (Cl. 119—51)

This application is a continuation-in-part of my application Ser. No. 398,223, filed Sept. 22, 1964, now abandoned.

The invention relates to the handling of particulate material, such as feed, for livestock such as cattle and other animals.

The method and device of the present invention relates to the handling of particulate material, such as cattle feed, which may be conveyed on a belt or sheet to an animal-feeding location, where it stays while cattle or other animals eat it.

Endless feed-carrying means have previously been suggested for feeding livestock. Such means although labor-saving to a degree have not proved entirely satisfactory for various reasons, including expense.

In accordance with my invention, I use a belt or other flexible conveyor member which is longer than the total length of the feed trough to be used. This belt is entrained around a roller, located at the loading end of the trough. This end of the trough is always located at or near the source of supply of the feed to be used. Clamps, which we call drawbars, are secured to each end of the belt. They are used to make the transition from the belt to pulling cables which are connected to separate winch drums.

The main object of the invention is to distribute livestock feed along the entire length of a feed trough on a flexible conveyor belt. The belt is slowly drawn toward the opposite end of the feed trough, as feed is continually loaded onto it at one end of the trough. When the belt approximately reaches the opposite end of the feed trough, it is stopped and remains stopped until the next time to feed, which may be a day later. The feed will be distributed from one end of the trough to the other on top of the flexible conveyor belt. The animals will eat until most or all of the feed is gone from the belt while in the trough.

When the next feeding time is due, the operator reverses a control switch, which causes the power unit to run in reverse direction and draw the flexible belt back and under the feed trough. This positions the belt for the next feeding. It also automatically cleans the feed trough by removing the feed-holding belt and reversing it to allow the feed remains to drop off.

It is, therefore, a primary object of the present invention to provide a flexible conveyor arrangement for feed material or the like, driven first in one direction and then in the other, from one end of a feeding trough, the sides of said trough being exposed so that animals may eat the material off the conveyor.

Another object of the present invention, in accordance with the foregoing object, is to provide a cable-driving winch assembly through which the feed moving conveyor may be driven from a single reversible motor under control of an operator.

A further object to the present invention is to provide a reversible clutch control drive mechanism for a feed-moving conveyor, featuring a pair of cable winding drums alternately driven from a single source of motive power, the direction of drive automatically controlling the clutch so as to drivingly connect the appropriate drum to the drive train.

A still further object of the present invention is to provide, in association with a reversibly driven feed-moving conveyor, limit control means for the reversible drive mechanism to automatically stop operation thereof as the conveyor approaches either of its limit positions.

An additional object of the invention is a labor-saving method of feeding livestock, wherein the animals are allowed to eat feed while it is on feed-transporting means, which is later removed and cleaned by reversing, preparatory to repetition of the operation.

These together with other objects and advantages which will become subsequently apparent, reside in the details of construction and operation as more fully hereinafter described, reference being had to the accompanying drawings forming a part hereof, wherein like numerals refer to like parts throughout, and in which:

FIGURE 2 is a side elevational view, which parts in vertical section, of the device illustrated in FIGURE 1.

FIGURE 6 is a fragmentary enlarged side elevational view, on the line VI—VI of FIGURE 4, with parts in section.

FIGURE 7 is an enlarged sectional view of the upper drawbar portion of the feed belt, on the line VII—VII of FIGURE 1, in the direction of the arrows, the details of the lower drawbar being similar.

FIGURE 8 is a fragmentary horizontal sectional view on the line VIII—VIII of FIGURE 3, in the direction of the arrows.

Referring now to the drawings in detail, it will be observed, from FIGURES 1 through 4, that the material-handling device generally referred to by the reference numeral 10, is built around an elevated elongated horizontal trough 11 formed by a pair of side wall members 12 and 14. The members 12 and 14 are secured to a plurality of vertical post members 16, so as to support the side wall members vertically spaced above the ground, or other supporting surface.

The trough 11 includes a bottom member 18 secured to the side wall members 12 and 14 and supported between the vertical post members 16 by angle-iron members 20. Also supported between the post members 16 below the bottom member 18 of the trough 11, and in parallel spaced relation thereto, is an elevated elongated guide member 22. The guide member 22 may also be supported by angle members 24, while side members 26 and 28 may also be provided on opposite sides below the side members 12 and 14.

One end of the trough 11 so formed constitutes a feed-received portion 30 and, as more clearly seen in FIG- URES 2 and 4, an idler roller 32 is rotatably mounted at the end 30 about an axis disposed between the planes of the bottom of said trough and the top surface of the guide portion 22, as by means of roller-bearing assemblies 34 receiving the roller axle 35 and mounted on the posts 16 adjacent said end. Entrained about the roller 32, is a relatively-wide flexible conveyor sheet or feed holding belt 36, the upper run of which is slidable over the bottom member 18 of the trough 11, while the lower run of the belt is slidable over the guide member 22. Brackets 33 secured to the end posts 16 desirably carry the assemblies 34, as shown in FIGURES 1, 2, 4 and 6.

It will be apparent, that movement may be imparted to the conveyor belt 36 in opposite directions, so as to move feed material between the side walls 12 and 14 of the trough 11 toward or away from the end 30 thereof. The outer surface of the conveyor belt will be cleaned by the member 22 along which it is moved as a lower run. The opposite ends of the conveyor belt are connected to rigid drawbar members, such as angle irons 38 and 40, to which the ends of cables are connected by belt-pulling assemblies.

Figures 2, 6, 7, 8:
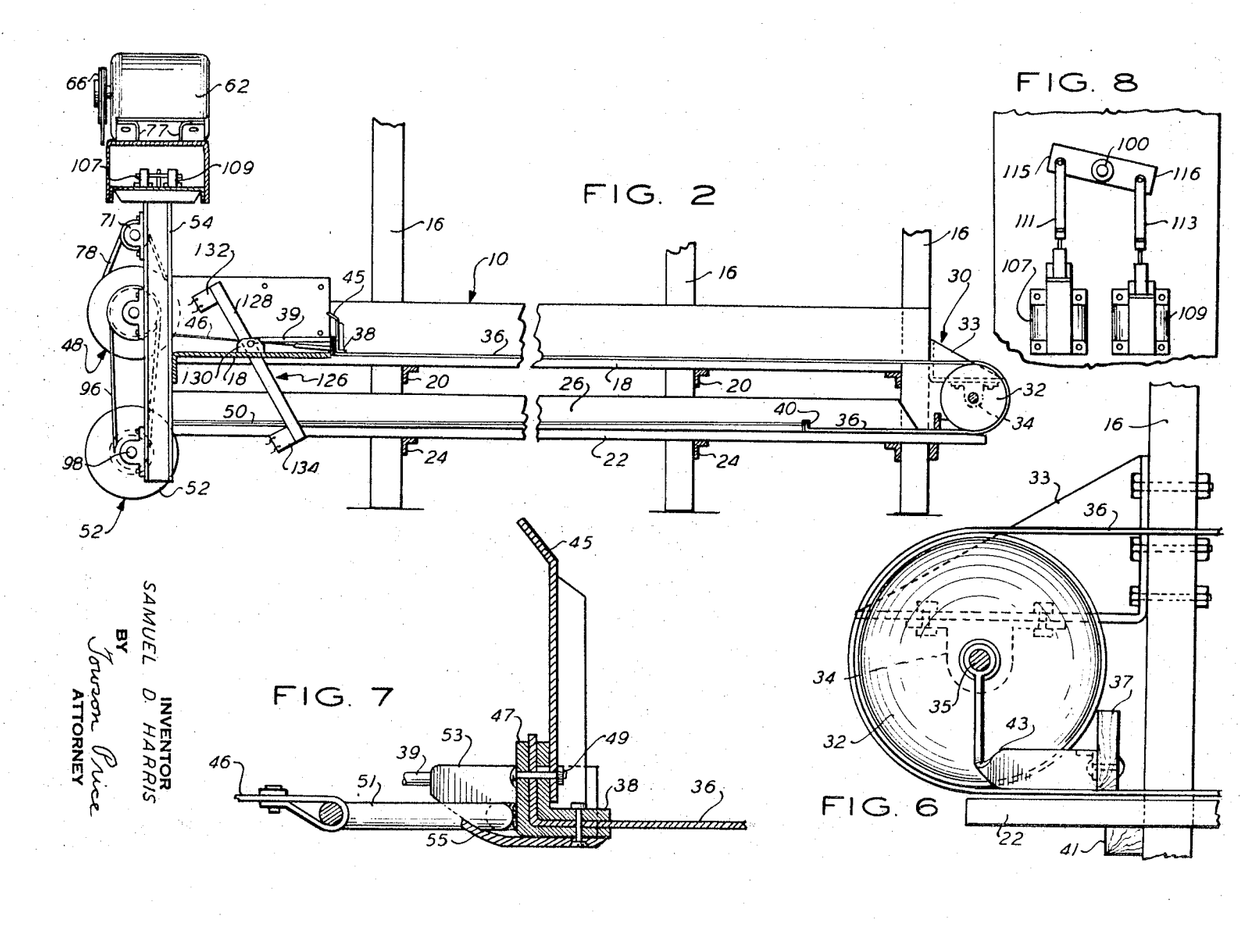

In order to transfer the pulling force of cable 46 to the material-conveying sheet 36, which is thin and broad, I sandwich the sheet between the drawbar member 38 and a rigid angular member 47. These members are held or squeezed together by a number of bolts 49 spaced at intervals over the length of both legs of said angular members. A V-shaped piece 51 is attached to angle iron 47 so that the point of the V is in the center of the drawbar 38, 47. The cable 46 is looped around the piece 51 at the V point and thus is clamped so that it will move the drawbar when pulled.

Figure 1:
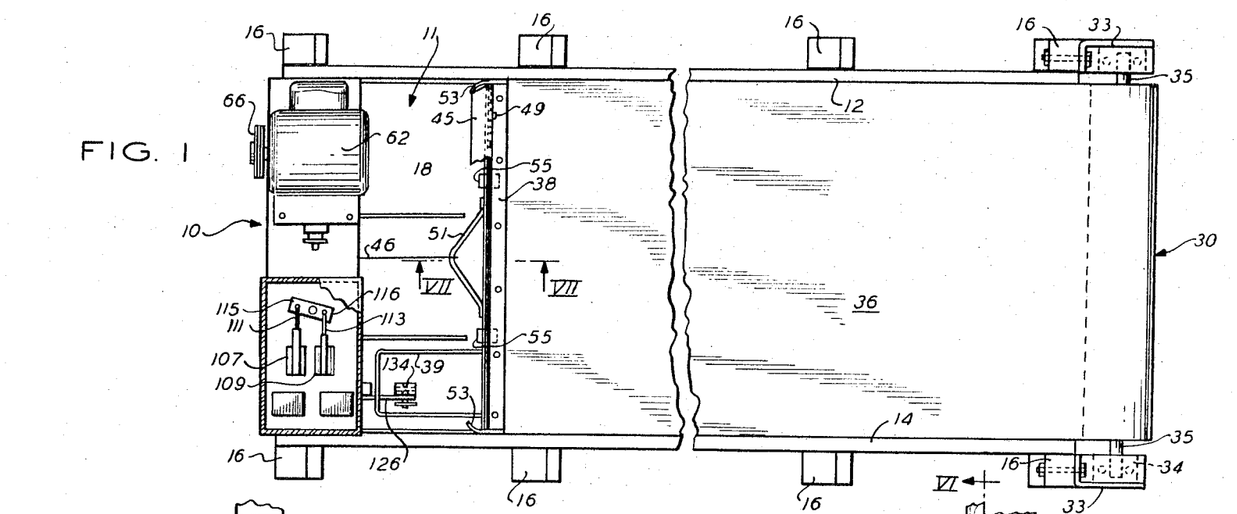
FIGURE 1 is a top plan view of the material-handling device of the present invention.

Guide shoes 53 are used to prevent the ends of the drawbar from hanging on projections on the sides of the trough 11 that the conveying belt 36 is moved in. These shoes are curved as shown in FIGURES 1 and 7. A runner 55 is used on the bottom of the drawbar to prevent the heads of the bolts 49 from hanging on any irregularity on the floor of the trough that the conveying belt slides over. It curves upward on its front edge and is beveled on its rear as shown in FIGURE 7.

With its parts placed as just described, the conveying sheet 36 is connected to a cable or rope 46 to move the sheet only in the direction of the cable. The guide shoes are employed with each of the assemblies 38 used as described, one on each end of the flexible conveyor and two separate cables, 46 and 50. The flexible conveyor 36 can be made to reciprocate or move in either direction, depending on which cable is pulled.

Referring now to FIGURES 1, 2, 3 and 5, it will be observed that one end of the conveyor belt 36 is connected by the rigid member 38 to the cable 46 which is anchored to and wound upon an upper cable-winding drum assembly 48. The cable 50, connected to the other end of the conveyor belt 36 by the rigid member 40 is anchored to and wound upon a lower cable-winding drum assembly 52. The cable winding drum assemblies 48 and 52 are, therefore, mounted at the power end of the trough 11, opposite the end 30, by means of the frame assembly including the parallel spaced vertical frame members 54 and 56 on which spaced journal assemblies 80 and 98 are mounted. A vertical frame member 58 is also provided for cooperating with the member 56 in mounting additional journal bearing assemblies.

In order to prevent the feed material which sometimes gets on the inner or pulley side of the conveying sheet 36 from being pressed between the pulley and said conveying sheet, a scraper 37 is floatingly carried by angular support members 43 pivoted about opposite end portions of the axle 35, in front of the roller or pulley to block or dam up this material.

FIGURE 6 shows the conveying sheet 36 as it comes off the bottom of the roller and goes into the lower guide portion 22 of the trough 11. A support board 41 is shown at the end of the trough. The floating scraper 37 rests on top of this support board and the conveying sheet 36 slides between these two members 37 and 41 and is wiped clean of any material.

When the conveying sheet 36 is run forward, or in the feeding cycle, any material that has gotten on the roller side of the conveying sheet will be carried towards the roller end of the trough. This scraper board 37 blocks this material from going between the sheet and the roller. After a period of time, the material which this board has held back has to be cleaned off by hand at its drawbar end.

In order to prevent feed material from spilling over the top drawbar 38, a shield 45 is attached to this drawbar is shown in FIGURES 1, 2 and 7. This shield 45 in effect forms a movable end to the trough 11 as it moves with the drawbar assembly from near the roller end of the trough to the drive unit end of the trough. A U-shaped bracket 39 is secured to the angle iron 47 in a position so it will strike the limit switch lever 128, as shown in FIGURE 2.

A reversible electric motor 62 is supported by a mounting bracket 64 interconnected with the vertical frame members 54, 56 and 58 above the drum assemblies 48 and 52. The shaft 63 of the motor 62 has connected thereto a variable pitch or cone drive pulley 66, about which a drive belt assembly 68 is entrained for imparting rotation to a driven pulley 70 connected to a shaft 72 rotatably supported by a worm gear box with gear drive assembly 65, mounted on a second or output shaft 74 and braced with respect to the member 58 by angular torque bar member 67.

The pulley is spring-loaded so that by turning the crank 91 the speed of drive is varied by changing the diameter at that part of the pulley engaged by the belt. The crank tightens the belt and allows moving the motor without tools to change the speed of the machine.

Adjustment of belt tightness is provided for by securing the base of the motor 62 to a subbase 77 pivoted to a plate 79, as indicated at 81, in turn mounted on the bracket 64. An adjusting rod 83 threaded through a securing member 85, pivoted to lugs 87 upstanding from said plate 79, has one end pivotally secured to a trunnion device 89 turnably mounted in said subbase and the other end carries an adjusting crank 91 with a handle 93. After turning the crank 91 until the subbase 77 is swung sufficiently to the left, as viewed in FIGURE 3, to apply the belt 68 to the pulleys 66 and 70, the crank is turned in the opposite direction until the belt is sufficiently tight.

The worm gear box 65 is mounted on the frame by its output shaft 74, with two bearings at each end of the shaft, that is, the extreme end bearings 69 and 71, and the gear box bearings 73 and 75 therebetween. The shaft 72 is thus drivingly connected to the shaft 74, spaced thereabove, by means of a worm on shaft 72, the shaft 74 being rotatably mounted between bearing assemblies 69 and 71 on the frame posts 56 and 58. A sprocket drive assembly 78 drivingly connects the shaft 74 to an input shaft 80 which is journaled in bearing assemblies on the frame posts 54 and 56. The drum assemblies 48 and 52, under control of a reversible clutch mechanism generally referred to by reference numeral 82, are driven from the input shaft 80.

The clutch mechanism 82 is operative to automatically impart powered rotation to one of the drum assemblies in one direction when the reversible motor 62 is driven in a corresponding direction. Reversal of the motor 62 automatically operates the clutch mechanism so as to drivingly connect the other drum assembly to the input shaft 80 for driving it in the opposite direction. In this manner, directional control over the movement of the conveyor belt 36 may be exercised by the operator through directional control of the single reversible motor 62. When the motor is stationary, the clutch mechanism will remain engaged in one of the driving positions.

Figure 3:
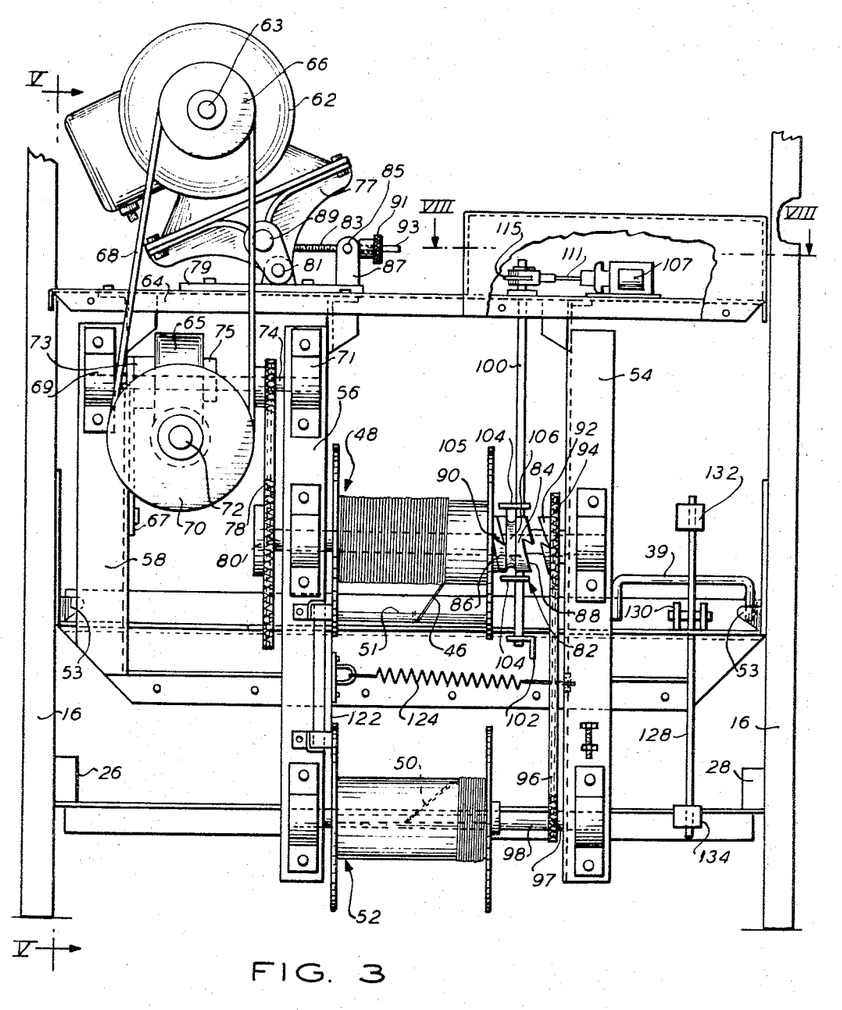
FIGURE 3 is an end view of the material-handling device as seen from the power-driven end and with the clutch-control drive mechanism in position for driving the upper cable-winding drum.
Figure 4:
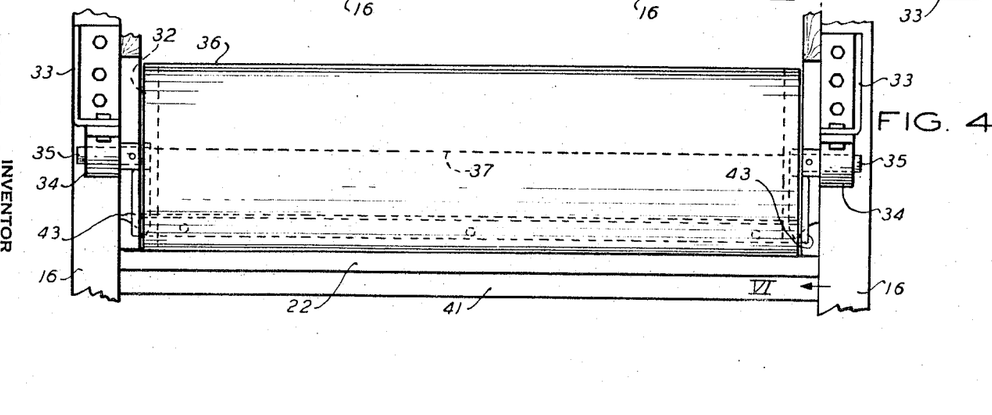
FIGURE 4 is a partial view of the material-handling device, as seen from the opposite end thereof.

Referring now to FIGURES 1, 3 and 8, it will be noted that the mechanism 82 includes a slidable clutch member 84 which is splined to the input shaft 80 for rotation therewith. Member 84 is slidably displaceable along the input shaft 80 to either of the two operative or clutch-engaging positions, between the left-hand position illustrated in FIGURE 3 and the right-hand position. The slidable clutch member 84 is formed at opposite axial ends with oppositely-directed clutch teeth 86 and 88, so as to alternately engage the oppositely-directed teeth on the clutch elements 90 and 92. The clutch element 90 is secured to, or formed on, one axial end of the drum assembly 48 which is rotatably mounted on the input shaft 80.

Accordingly, when the clutch member 84 is displaced into engagement with the clutch 90, as shown in FIGURE 3, rotation will be imparted in one direction to the drum assembly 48. When the clutch member 84 is displaced to its other operative position, not shown, rotation will be imparted through driven clutch element 92 to the driven sprocket member 94, drivingly connected by the sprocket chain 96 to a sprocket 97 fixed on the driven shaft 98, to which the drum assembly 52 is connected. The clutch member 84 is automatically displaced into one or the other of its operative positions, dependent upon the direction in which the input shaft 80 is rotated by the reversible motor 62.

Shifting movement is imparted to the clutch member by an actuating shaft 100 pivotally supported at its lower end by the frame member 102. The actuating member 100 includes yoke portions 104 fixed on the shaft and with fingers 105 engageable within the groove 106 of the clutch member 84 for shifting thereof.

Figures 5, 9:
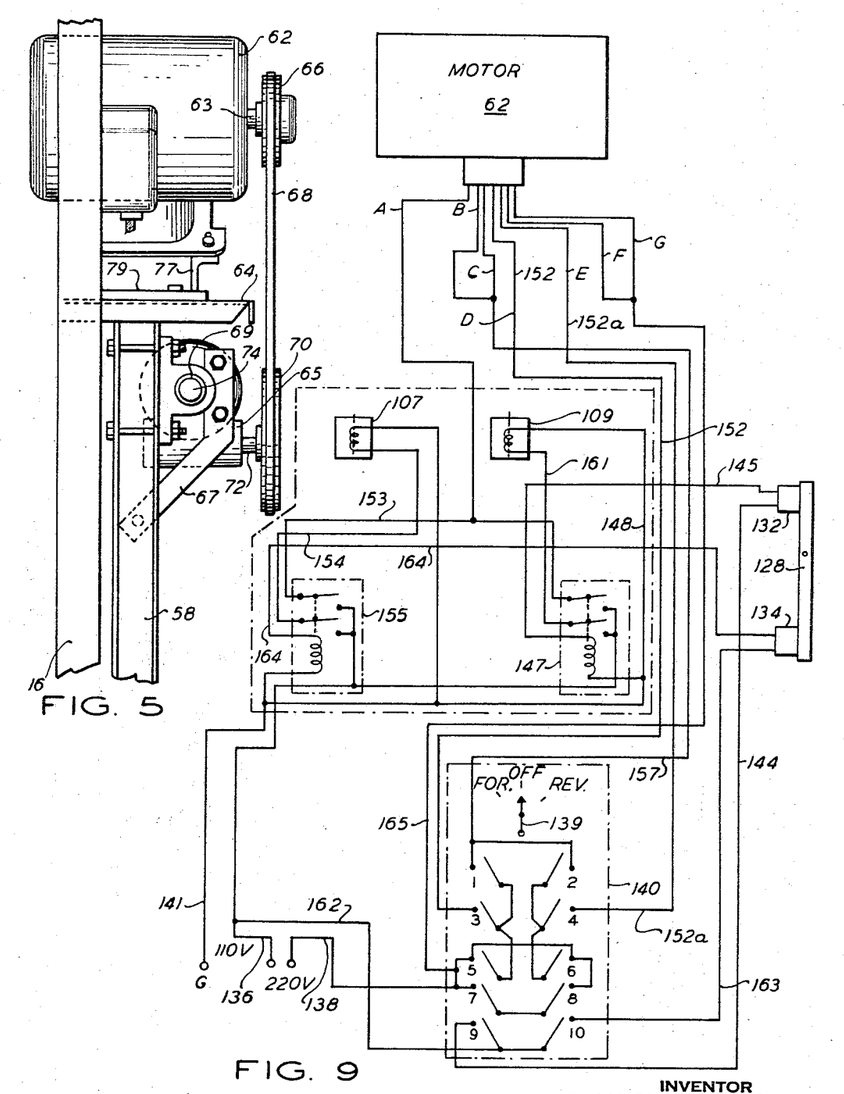
FIGURE 5 is a vertical elevational view, with parts in section on the line V—V of FIGURE 3, in the direction of the arrows.
FIGURE 9 is an electrical diagram showing the control circuit for reversing the motor associated with the device of the present invention.

In order to shift this clutch to the correct side in relation to the direction the drive shaft is turning, solenoids 107 and 109 are used as shown in FIGURES 1, 3 and 8 with rods 111 and 113 and cranks 115 and 116 projecting from the actuating shaft 100. The solenoids shift the clutch member or block 84 when one or the other is energized. They have to be correctly wired in relationship with the reversing motor control. (See FIGURE 9 showing the wiring diagram for one form of control system.)

The object of using this means is to have a simple mechanical shift which operates very quickly in response to a change in the direction of rotation of the motor. The object of independently powering the cable winding drums is dictated by the fact that due to cable building up, the two drums have to turn at different angular speeds. When one drum is being powered and is winding cable onto itself, the other or opposite drum must be free to pay off cable as needed due to the fact they hook to opposite ends of the conveyor belt 36. The object of using two drums is dictated by the fact that to reciprocate the conveyor and have positive pulling means, two independently-powered winch drums are needed, in order to use one power source and speed-reducing means to power each drum, in response to the direction of rotating of the power source.

It will, therefore, be apparent, that the drum assemblies 48 and 52 are alternatively driven in opposite directions, depending upon the rotational direction of the input shaft 80, which in turn is drivingly connected by the sprocket and belt drives to the reversible motor 62.

Directional control of the reversible motor 62 by the operator will enable him to displace the conveyor belt in either direction, inasmuch as only one of the winding drum assemblies will be rotated in the proper corresponding direction. A cable will, therefore, be wound upon that drum which is being powered and one will unwind from the drum that is not being powered. A brake member 122 is guidingly mounted by the frame post 56 and yieldably urged into engagement with the end flanges of both drum assemblies 48 and 52 by means of the spring member 124, as seen in FIGURE 3. Rotation of both drum assemblies is thereby retarded to prevent overrunning of the nonpowered drum, so as to control unwinding of the cable therefrom.

Automatic facilities are provided for stopping operation of the power drive mechanism as the ends of the conveyor belt 36 approach limit positions beyond which movement is no longer desired. Referring, therefore, to FIGURES 2 and 7 in particular, it will be observed that slots are formed in the bottom member 18 and member 22 so as to accommodate limit control mechanism, generally referred to by reference numeral 126. The limit control mechanism includes a lever member 128 pivotally mounted on a bracket 130 intermediate the upper and lower ends thereof, so that the lever member may be engaged by either the U-shaped bar 39, projecting from the rigid member 38 at one end of the conveyor belt, or by the rigid member 40 at the other end of the conveyor belt, depending upon which end of the conveyor belt is approaching the limit position. Mounted respectively at the upper and lower ends of the lever member 128, are position sensing switch devices, such as mercury switches 132 and 134. It will be apparent that when the lever member 128 is in a vertical or neutral position, to which it is biased by gravity, the mercury switches 132 and 134 will be in positions closing the contacts thereof. When however, one end of the conveyor belt approaches its limit position, as illustrated in FIGURE 2 for example, the lever member 128 will be pivotally displaced, causing the contacts of one of the mercury switches to open, thereby disabling operation of the powered drive mechanism.

Referring now to FIGURE 9, it will be observed that the reversible motor 62 may be connected to a source of electrical energy by the power lines 136 and 138 through a reversing drum switch 140 using a ground line 141. Accordingly, the direction of rotation of the motor 62 may be controlled by the operator through the reversing switch assembly for operation of the material handling device as aforementioned. When however, the conveyor belt approaches either of its limit positions, one of the contacts for mercury switch 132 or 134 is opened in order to interrupt the motor circuit and thereby stop operation. Energization of motor 62 may then be resumed only by reversing the position of the reversing drum switch 140. As further explanation, note that to reverse the rotation of the motor, lines 152 and 152a are interchanged. In the drum switch, power flows from line 138 to the drum switch 140 for either operative position.

The motor 62, which I prefer to use in the disclosed embodiment of my invention, is one of the 1 H.P. single phase 115/230 volt type, manufactured by Dyna Corporation of Dayton, Ohio. It is identified in the corporation's Bulletin No. 11000B of June 1, 1965, as a "Dyna" motor, the term "Dyna" being a registered trademark. It has a rated speed of 1750 r.p.m. and its catalog No. 8099MO. It is a capacitor start-induction run, A.C. 60 and 50 cycles, ball bearing motor.

The connections inside the motor are such that the lead designated D in FIGURE 9, runs through a starting capacitor, giving a split-phase effect for starting torque, before reaching the field windings. On attaining a normal speed, the starting windings are cut out by a centrifugal switch and the motor runs on its main or field windings. As this is an induction motor, all the exterior connections are to the field windings, none to the rotor. There are actually seven leads, A to G, inclusive, to the motor, although its name plate shows only six. It is considered that leads F and G, being connected, are really only one lead. The name plate shows the leads in the order 1, 3, 5, 2, 4 and 8, stating that to reverse, leads 5 and 8 are interchanged, that is, presumably what are here called leads D and E.

To trace the power flow through the controls to the motor 62, there is in FIGURE 9, 220 volt incoming power lines 136 and 138. Line 141 is grounded and connects to one side of the 110 volt coils in the relays 155 and 147 and also to the coils of the solenoids 107 and 109. The mercury switches 132 and 134 also operate on 110 volts, which is that between the lines 136 and 141.

Power line 136 is run to all terminals on one side of relays 155 and 147. Power can be drawn for the desired purpose only when one of the relays 155 and 147 is closed. The motor operates on 220 volts and has seven leads designated A to G inclusive. Line 153 connects motor lead A to one post only of each of the relays 155 and 147. The opening of the circuit to line 153 stops the motor from operation in either direction. Power line 154 completes a circuit to solenoid 109 when relay 155 is closed. Power line 161 completes a circuit to solenoid 109 when relay 147 is closed.

In order to close either of these relays, line 162 connects power line 136 to the spring switches 9 and 10 of a reversing drum switch 140 having ten spring switches operable by a cam array. Such switches are manufactured by Allen-Bradley Co. of Milwaukee, Wis. It is preferred to use one of size 0, style BK, type 1, see bulletin 350 of that company for wiring instructions. The operator determines which way the power flows out of the drum switch by a three-position handle 139, which turns the cam about the axis between two rows of five spring switches each. The three positions of the handle are, from left to right as viewed in FIGURE 9 "forward," "off," and "reverse," with "Off" the center position. The drum portion of the switch is turnable about its longitudinal axis. The cams effect the opening and closing of the spring switches 1 to 10, inclusive, for connecting associated upper and lower contacts.

Now say when the top run of the belt 36 and its rigid member 38 is at the extreme right as viewed in FIGURES 1 and 2, an operator moves the handle from the "off" position, where all of the spring switches are open, to "Forward." In this position, switches 3, 5, 6, 7, 9 and 10 are closed. Switch 9 will then allow power to flow from line 136 through line 162 to line 144. This line connects to mercury switch 132 mounted on stop bar 128. As long as stop bar 128 is in a vertical position, power flows along line 144 through mercury switch 132 and to line 145. The line 145 connects to the other coil terminal of relay 147.

Relay 147 will now close and remain closed until either the operator moves the drum switch handle to "off" which opens all the switches 1 to 10, inclusive, or the U-shaped bar 39 of the belt drawbar 38 contacts stop bar 128 and tilts the mercury switch 132 into an "off" position.

This is on the top drawbar, as it is important to have the correct mercury switch energized in relationship to the motor rotation. If the bottom mercury switch 134, were instead moved to "off" position the motor 62 would not be stopped and damage to the machine would occur. As long as relay 147 is closed, power is flowing from line 136 to the motor lead A and, at the same time, along line 161 to energize solenoid 107 and move the slidable clutch member 84 to the left to the position viewed in FIGURE 3, to effect a forward operation of the belt 36 to the position shown in FIGURES 1 and 2.

If the operator moves the handle 139 to "reverse," switch 10 will close between the corresponding bottom and top posts of the drum switch 140 and allow power taken from line 136 to flow along line 162 to line 163. This line 163 connects to mercury switch 134 mounted on stop bar 128. As long as stop bar 128 is in a vertical position, power flows along line 163 through mercury switch 134 to line 164. This line 164 connects to the other terminal on relay 155.

Relay 155 will now close and remain closed until either the operator moves the drum switch handle to "off" or the bottom belt drawbar 40 contacts stop bar 128 and tilts the mercury switch 134 to "off" position. As long as relay 155 is closed, power from line 136 will flow to lead A of the motor 62 and, at the same time, along line 154 to energize the solenoid 107 and move the clutch member 84 to the right, as viewed in FIGURE 3, to be ready for an operation of the belt in the opposite direction.

In order to reverse the motor 62 and direct power to the lead G, leads B and C from the motor are connected together and run along line 157 to switch 1 on the drum switch 140. Lead D, which is an interchange lead, is run to switch 3 of the drum switch 140 along line 152. Lead E, which is also an interchange lead, is run to switch 4 of the drum switch 140 along line 152a.

Lead G united to lead F is connected to switch 5 of drum switch 140 by line 165. Incoming power from line 138 is run to switch 7 on drum switch 140, using top or bottom terminal. When the handle 139 is moved to either "forward" or "reverse" position power can be taken from line 138 through the connection provided at switch 8, as a jumper wire is placed between switches 8 and 6. When power reaches switch 6, it crosses along a jumper to switch 5. Since lead G is hooked to lead 5, power flows to it and at the same time to switch 3 connected to it.

When the power again flows from switch 6 to switch 5 and thence to lead G at the same time, it is also connected to lead E by a line between switches 6 and 4. Also switches 3, 2 and 5 are connected together by the line between switches 1 and 3.

As a practical matter, when the machine is wired it might be found necessary to interchange the positions of lead wires D and E with respect to switches 3 and 4 in order to have the correct motor rotation with respect to the solenoid shift. This is because the solenoids 107 and 109 pull only one way and are mechanically hooked to the clutch mechanism.

FIGURE 3 shows slidable clutch 84 engaged with upper cable drum 48. FIGURE 8 shows solenoid 109 energized, which will have moved clutch 84 to the position shown in FIGURE 3. If the motor 62 were not turning in the correct direction at this time, the clutch teeth would slide the clutch 84 back out of engagement with the drum 58 and would not turn it at all, neither would it shift to the sprocket teeth 92 for the solenoid would be trying to pull it in engagement with drum 48.

It would be possible to use the solenoids 107, 109 and a reversing motor starter in place of the drum switch 140 and the two pole relays 147 and 155. The motor starters would then require six contact points in each set for the motor here used. A reversing starter is two starters side by side, with one wired for one direction and the other for the reverse direction. These starters would do the same thing as the drum switch, but would not change the relationship for correct motor rotation with the appropriate solenoid.

From the foregoing description, the construction, operation and utility of the material-handling device 10 will be apparent. In particular, the utility of the device in connection with the cattle feeding will be readily appreciated inasmuch as material loaded into the trough on the belt 36 adjacent to end 30, between the side walls 12 and 14, may be advanced until it extends approximately from end to end. Movement of the conveyor belt from the end 30 toward the power end of the trough is achieved by operating the upper cable winding drum assembly 48, during which time the feed belt 36 is loaded from any source of supply positioned near the end 30.

The reversible motor 62 is energized for rotation in the proper direction by the reversing drum switch 140. While being loaded, the conveyor belt 36 is advanced along the feeding trough for the animals to each off of it. It is thereafter cleaned as its lower run slides under the trough after reversal. The movement of the belt will be automatically stopped when the limit control mechanism 126 is pivotally displaced as aforementioned. Directional movement of the conveyer belt may be reversed for reloading until the other limit position thereof is reached.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. The method of feeding livestock, including the distribution of particulate food material at an animal-feeding location, comprising slowly moving, from beneath a feeding trough, a conveyor belt having a leading end, along said trough and around a roller located adjacent one end of said trough, continuously loading such material onto said belt while it is so moving, stopping the movement of said belt when its leading end approximately reaches the opposite end of said trough, and allowing animals to eat the material while on the belt in said trough.

2. The method of claim 1, including drawing the belt from the trough, in the reverse direction, around the roller and under said trough, when the next feeding time is due, thereby cleaning said belt, by reversing its position, preparatory to a repetition of the operations.

3. A livestock feeding device comprising an elevated elongated trough, an elevated belt guide portion disposed beneath said trough, a roller rotatably mounted at one end of said trough about an axis disposed between the planes of the bottom of said trough and the top surface of said guide portion, a belt for holding feed for livestock on a portion thereof while in said trough, and power means for alternately drawing the belt around said roller between a position, where most of it lies in and rests on the bottom of said trough for thereon holding feed for livestock, and a reversed position where most of it is supported on said guide portion.

4. A livestock feeding device as recited in claim 3, wherein each end portion of the belt is clamped between a pair of rigid angular members forming drawbars, means holding each pair of angular members squeezed together about its end portion of the belt, a V-shaped member connected to each pair of angular members so that the point of the V lies on about the central transverse vertical plane of its members, and a cable connected to each V-shaped member near the point of the V for connection to said power means.

5. A livestock feeding device as recited in claim 4, wherein guide shoes are carried on the ends of the drawbars to prevent them from catching on trough projections, and bottom runners are carried on, and intermediate the ends of, said drawbars to prevent the holding means from catching on any irregularity on the bottom of the trough.

6. A livestock feeding device as recited in claim 3, wherein the power means comprises cables connected to the belt for imparting movement thereto in opposite directions, a pair of cable winding drums rotatably mounted at said other end of the trough and to which the cable means are connected, and reversible drive means operatively connected to the drums to alternately power the respective drums for rotation in one direction or the other.

7. A livestock feeding device as recited in claim 6, wherein the reversible drive means comprises clutch means having an element movable to cause operation of one drum or the other, the power means includes a reversible motor drivingly connected to said clutch means, and control means responsive to the direction of rotation of the motor for displacing said movable element from one engaged position to another engaged position drivingly connecting the motor to an appropriately selected one of said drums.

8. A livestock feeding device as recited in claim 6, including brake means for yieldingly retarding rotation of both of said drums.

9. A livestock feeding device as recited in claim 6, including limit means movably mounted adjacent said other end of the trough for disabling the operation of the motor in response to approach of the conveyor means to said other end, either through the trough or beneath the trough.

10. A livestock feeding device as recited in claim 8, including limit means movably mounted adjacent said other end of the trough for disabling operation of one of the drums in response to approach of the belt to said other end, either through the trough or beneath the trough.

11. A material handling device for feeding animals or the like comprising, an elongated trough having opposite delivery and power ends, a roller mounted at the delivery end of the trough, flexible conveyor means entrained about said roller for movement through and beneath the trough, elongated conveyor supporting means mounted in spaced relation below the trough for guiding said movement of the conveyor means beneath the trough, cable means connected to the flexible conveyor means and extending therefrom toward the power end, means for pulling said cable means from said power end of the trough, automatically reversible drive means at said power end operatively connected to the cable-pulling means for movement of the conveyor means in opposite directions, and movement limiting means movably mounted adjacent said power end only of the trough for disabling operation of the cable-pulling means in response to approach of the conveyor means to said power end, either through the trough or beneath the trough, whereby the delivery end is free of drive and control means.

12. A reversible clutch assembly for alternatively connecting an input shaft to one of two driven members in which said shaft is rotatable comprising, oppositely engageable clutch elements connected to said driven member, clutch member splined on said shaft and slidably displaceable into engagement with one or the other of said clutch elements for imparting rotation to one of said driven members in one direction or the other of said driven members in the other direction, said slidable member having an annular groove extending about its axis, an actuating shaft, output yoke portions fixed on said shaft and with fingers engageable within said groove, and means to oscillate said shaft about its axis comprising input crank positions fixed on said shaft, solenoids, rods projecting therefrom toward said input crank portions and connected thereto and means for the alternate energizing of one of said solenoids when the input member is operated in one direction, to effect operation of one of said driven members, or the other of said solenoids when the input member is operated in the other direction, to effect operation of the other of said driven members.

13. A livestock feeding device having a trough, a belt guide portion disposed beneath said trough, a roller rotatably mounted at one end of said trough, a belt having ends for holding feed for livestock on a portion thereof while in said trough, and controlling apparatus comprising a pair of cable-winding drums at the other end of the trough and to which cable means, connected to the respective ends of the belt, are secured, a reversible electric motor associated with two solenoids to shiftably connect it to alternately power the respective drums for cable-winding rotation, to pull the belt in one direction or the other, a circuit for controlling the operation of said motor comprising a reversing switch, a limit control lever pivotally mounted and biased to normally upright position, so that its upper end portion is operatively engageable by the upper run of the belt and its lower end portion is operatively engageable at the lower run of said belt at the extremes of desired belt travel, a switch carried at each end of said lever and formed so as to be closed when the lever is in upright position and open when tilted by said belt, said upper switch being in circuit with the motor and one of said solenoids when the upper end of the belt is being moved toward the upper end of the lever and said lower switch being in circuit with the motor end the other of said solenoids when the lower end of the belt is being moved toward the lower end of said lever.

14. A feeding device as recited in claim 13, wherein the trough is elevated and elongated, the roller axis is disposed between the planes of the bottom of the trough and the top of the guide portion, the means to shiftably connect the motor to alternately power the drums comprises a drive shaft for said drums, a clutch element splined on said shaft so as to be movable to engage a clutch element for one drum or the other, and the switches are those of the mercury type.

References Cited

UNITED STATES PATENTS

| | | | |
|---|---|---|---|
| 1,181,652 | 5/1916 | Eberhardt et al. | 192—93 X |
| 1,254,180 | 1/1918 | Ward | 192—43 |
| 2,516,798 | 7/1950 | Peterson | 198—218 |
| 2,604,874 | 7/1952 | Forbes et al. | 119—15 |
| 2,897,952 | 8/1959 | Cordis | 198—181 |
| 2,988,204 | 6/1961 | Sutherland | 198—224 |
| 3,103,838 | 9/1963 | Beacom et al. | 192—48 X |
| 3,180,317 | 4/1965 | Bruecker | 119—52 |
| 3,181,506 | 5/1965 | Seymour | 119—56 |
| 3,200,919 | 8/1965 | Lanigan et al. | 198—48 |

FOREIGN PATENTS 850,769  10/1960  Great Britain.

SAMUEL KOREN, *Primary Examiner.*

ALDRICH F. MEDBERY, *Examiner.*

UNITED STATES PATENT OFFICE
CERTIFICATE OF CORRECTION

Patent No. 3,333,574                                        August 1, 1967

Samuel D. Harris

It is hereby certified that error appears in the above numbered patent requiring correction and that the said Letters Patent should read as corrected below.

In the heading to the printed specification, line 4, for "Samuel D. Harris, Rte. 2, Louisa, Va. 23117" read -- Samuel D. Harris, Louisa, Va., assignor to Harris Company, Inc., Mineral, Va., a corporation of Virginia --.

Signed and sealed this 27th day of August 1968.

(SEAL)
Attest:

Edward M. Fletcher, Jr.                                        EDWARD J. BRENNER
Attesting Officer                                               Commissioner of Patents